United States Patent
Mayer

(10) Patent No.: US 7,185,572 B2
(45) Date of Patent: Mar. 6, 2007

(54) METHOD FOR ROUNDING OFF THE EDGE OF A RECESS ON A PISTON

(75) Inventor: Albrecht Mayer, Kusterdingen-Mähringen (DE)

(73) Assignee: Mahle GmbH, Stuttgart (GB)

( * ) Notice: Subject to any disclaimer, the term of this patent is extended or adjusted under 35 U.S.C. 154(b) by 172 days.

(21) Appl. No.: 10/381,181

(22) PCT Filed: Jul. 18, 2001

(86) PCT No.: PCT/DE01/02773

§ 371 (c)(1),
(2), (4) Date: Jul. 17, 2003

(87) PCT Pub. No.: WO02/27174

PCT Pub. Date: Apr. 4, 2002

(65) Prior Publication Data

US 2004/0031462 A1   Feb. 19, 2004

(30) Foreign Application Priority Data

Sep. 20, 2000   (GB) ............................... 100 46 420

(51) Int. Cl.
*B23B 5/24*   (2006.01)

(52) U.S. Cl. ...................... 82/1.11; 29/888.04; 29/558; 29/888.049; 82/114

(58) Field of Classification Search ................ 82/1.11, 82/114; 29/888.04; *B23B 5/24*
See application file for complete search history.

(56) References Cited

U.S. PATENT DOCUMENTS

| | | | | | |
|---|---|---|---|---|---|
| 4,345,138 | A | * | 8/1982 | Zammert | 219/121.66 |
| 5,337,714 | A | * | 8/1994 | Tracy | 123/279 |
| 5,642,706 | A | * | 7/1997 | Wirth et al. | 123/305 |

FOREIGN PATENT DOCUMENTS

| | | |
|---|---|---|
| DE | 20 18 174 | 2/1972 |
| DE | 2 124 595 | 4/1973 |
| DE | 37 41 218 | 7/1988 |
| DE | 37 09 969 | 10/1988 |
| DE | 43 26 978 | 2/1995 |
| DE | 197 03 121 | 5/1998 |
| DE | 199 52 868 | 5/2001 |
| JP | 0316703 A * | 6/1991 |

* cited by examiner

*Primary Examiner*—Monica Carter
*Assistant Examiner*—Sara Addisu
(74) *Attorney, Agent, or Firm*—Collard & Roe, P.C.

(57) ABSTRACT

The aim of the invention is to produce a rounding off on a diesel piston comprising a combustion recess and valve recesses that lie at a slant in relation to the piston floor. The rounding off should not significantly increase particle emissions. To this end, the edge of the recess is rounded off in the area of the valve recesses in a special machining phase, the cutting edges of the cutting tool being guided in one or more planes that are parallel to the inclined valve recess surface.

2 Claims, 2 Drawing Sheets

F-F

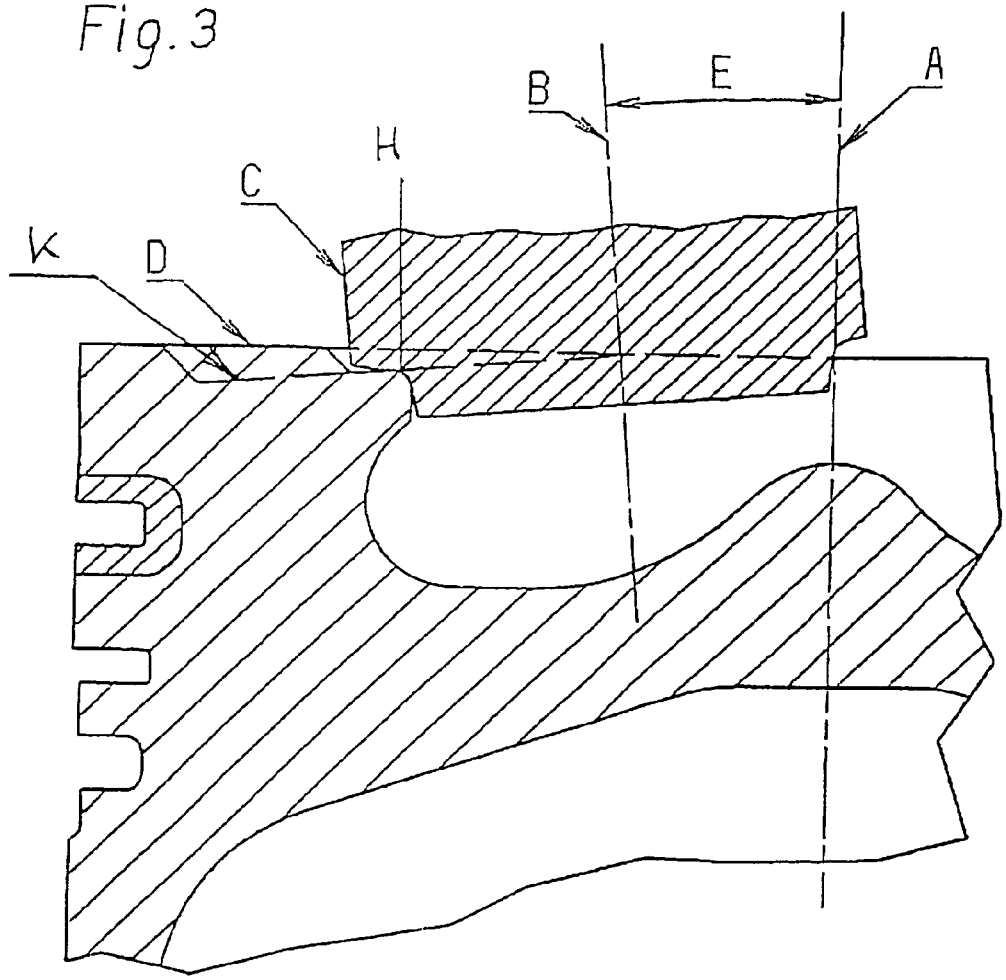

METHOD FOR ROUNDING OFF THE EDGE OF A RECESS ON A PISTON

CROSS REFERENCE TO RELATED APPLICATIONS

Applicant claims priority under 35 U.S.C. §119 of German Application No. 100 46 420.3 filed Sep. 20, 2000. Applicant also claims priority under 35 U.S.C. §365 of PCT/DE01/02773 filed Jul. 18, 2001. The international application under PCT article 21 (2) was not published in English.

BACKGROUND OF THE INVENTION

1. Field of the Invention

The invention relates to a method for rounding off the edge of a recess on a piston for direct-injection diesel engines.

2. The Prior Art

Such rounded-off recess edges are produced by means of lathe machining of the recess edge at the time the recess is machined by lathe, and serve to prevent tension concentrations. Valve recesses having a base surface that lies at a slant in relation to the piston floor, which intersect with the combustion recess, result in insufficient rounding of the recess edge in the area of the valve recesses. As a solution for the problem of insufficient rounding of the recess edge, it is already known to carry out the recess edge rounding as a so-called S-stroke rounding, see, for example, in DE 4326978, FIGS. 1 and 2. This solution, which is simple in terms of machining, has the disadvantage that the particle emissions increase because of the increased dead volume.

SUMMARY OF THE INVENTION

The invention is therefore occupied with the problem of producing a sufficiently rounded edge, using a method of the type indicated in the preamble, even in the case of valve recesses that lie at a slant in relation to the piston floor, without significantly increasing the dead volume.

This problem is solved by means a method for rounding off the edges of a recess on a piston for direct-injection diesel engines, which piston has valve recesses having a base surface inclined at a specific angle to the plane of the piston floor and wherein the recess edge regions beside the valve recesses have a rounded off recess edge produced by cutting machining, wherein inside the valve recesses, a second rounding off of the recess edges is carried out, which lies deeper in the recess as compared to the first rounding off, and wherein during rounding off the recess edge inside the valve recess by means of a concave cutting tool, the axis of the cutting tool lies perpendicular to the inclined base surface of the valve recess.

By guiding the cutting edge of the cutting tool parallel to the plane of the valve recess, sufficient and uniform rounding is achieved there.

BRIEF DESCRIPTION OF THE DRAWINGS

The invention will be explained in greater detail below, using an exemplary embodiment. The drawing shows.

DETAILED DESCRIPTION OF THE PREFERRED EMBODIMENT

Figure 1:
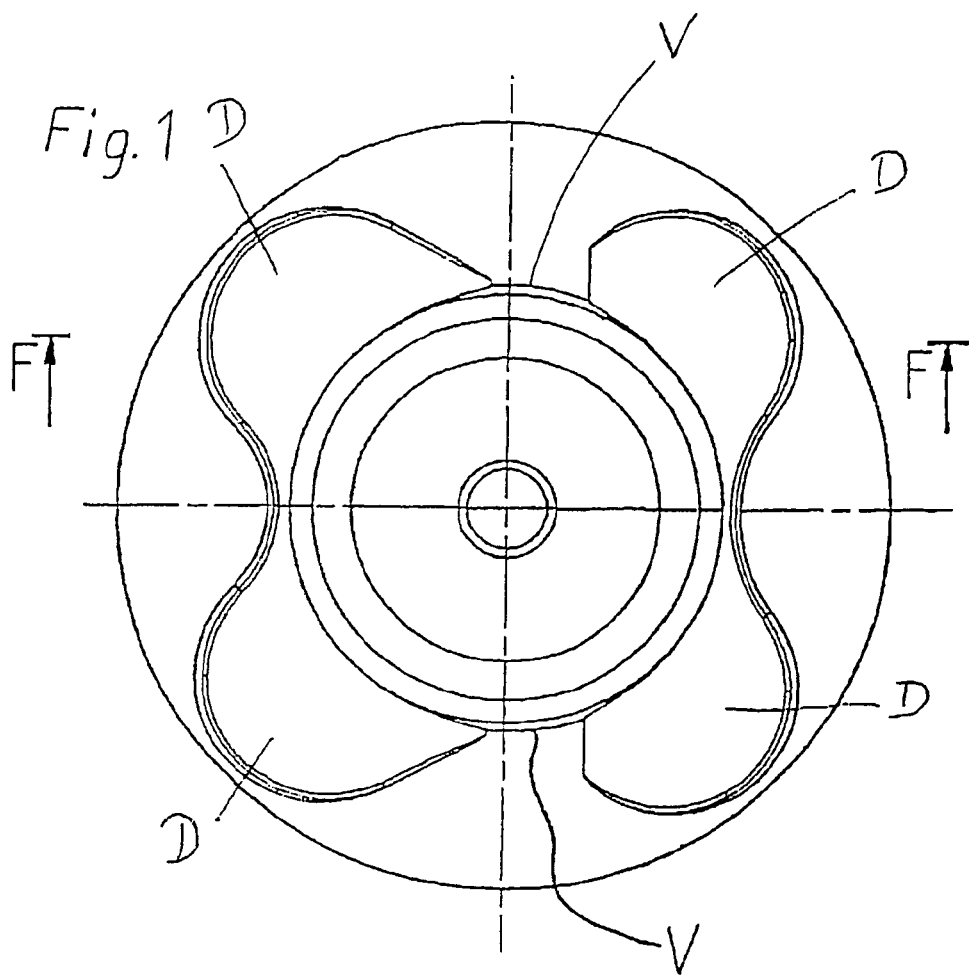
FIG. 1 a top view of a piston having four valve recesses, whereby the recess edge is rounded off only in the area next to the valve recesses, FIG. 2 a cross-section along line F—F from FIG. 1, FIG. 3 the implementation of the method according to the invention, using the piston from FIG. 1.

As is evident from FIG. 1, at first the recess edge is rounded off only in the areas V beside the valve recesses D, since the lower-lying, slanted valve recesses are not or are only partially affected by the lathe machining of the recess edge.

Figure 2:
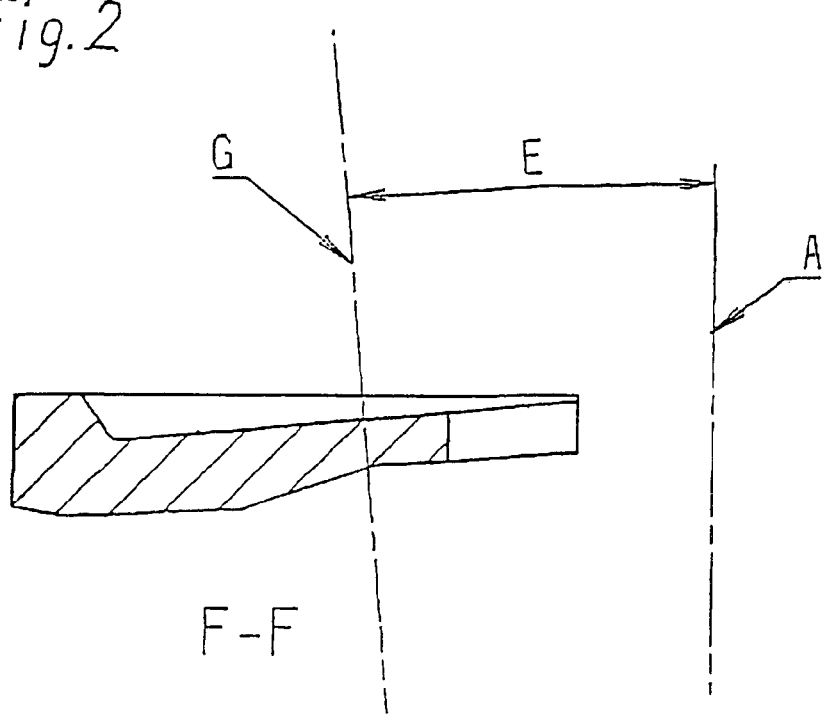

Therefore, sharp-edged, non-rounded recess edge regions remain inside the area of the valve recesses, as is evident in FIG. 2, and these result in tension concentrations.

According to FIG. 3, these sharp-edged recess edge regions are rounded off in a separate work step, independent of the preceding or, if applicable, also succeeding machining of the recess edge regions V that lie beside the valve recesses D.

In this connection, either the piston or the machining tool is set at a slant, so that the axis B of the rounding tool C lies perpendicular or at least approximately perpendicular to the plane that forms the base surface k of the valve recess D. The angle between the longitudinal piston axis A and the axis B of the machining tool, i.e., the perpendicular G to the valve recess (FIG. 2) is designated as E in the drawings.

Independent of whether the piston or the tool is set at a slant, the axis B of the cutting tool C lies perpendicular to the inclined base surface k of the valve recess D.

The invention claimed is:

1. A method for rounding off the edges of a recess on a piston for direct-injection diesel engines, which piston has valve recesses D having a base surface k inclined at a specific angle to a plane of a piston floor, comprising the following steps:

carrying out a first rounding off of recess edge regions V beside the valve recesses D:

carrying out a second rounding off of the recess edges inside the valve recesses D with a concave cutting edge H of a cutting tool C, said second rounding off lying deeper in the recess as compared with the first rounding off, wherein during said second rounding off, an axis B of the cutting tool C lies perpendicular to the inclined base surface k of the valve recess D.

2. A method for rounding off the edges of a recess on a piston for direct-injection diesel engines, which piston has valve recesses D having a base surface k inclined at a specific angle to a plane of a piston floor, comprising the following steps:

carrying out a first rounding off of the recess edges inside the valve recesses D with a cutting tool; and carrying out a second rounding off of the recess edges V that lie beside the valve recesses D with a cutting tool, wherein during said steps of rounding off, an axis B of the cutting tool lies perpendicular to the inclined base surface K of the valve recesses D.

* * * * *

UNITED STATES PATENT AND TRADEMARK OFFICE
CERTIFICATE OF CORRECTION

PATENT NO. : 7,185,572 B2  Page 1 of 1
APPLICATION NO. : 10/381181
DATED : March 6, 2007
INVENTOR(S) : Mayer It is certified that error appears in the above-identified patent and that said Letters Patent is hereby corrected as shown below:

TITLE PAGE, ITEM [73] ASSIGNEE: please change "Stuttgart (GB)" to

--Stuttgart (DE)--.

Signed and Sealed this

Twelfth Day of June, 2007

JON W. DUDAS
*Director of the United States Patent and Trademark Office*